Dec. 29, 1931.   P. PHAN-QUANG   1,839,000
AGRICULTURAL MACHINE
Filed April 18, 1930   3 Sheets-Sheet 3
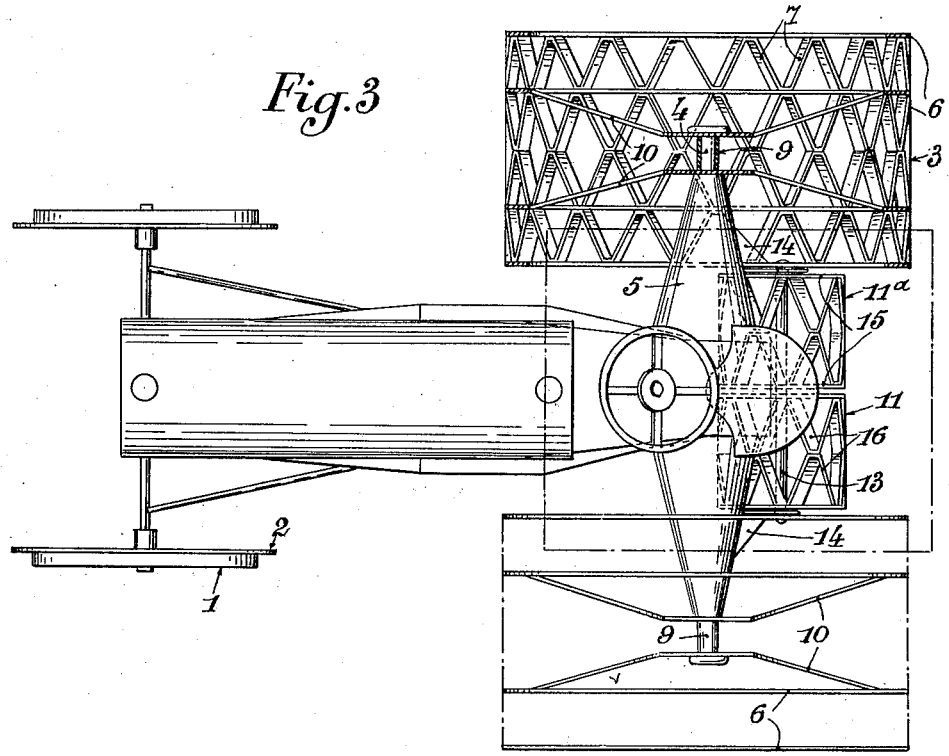
INVENTOR
PHUÔNG PHAN-QUANG
BY
ATTORNEYS Patented Dec. 29, 1931

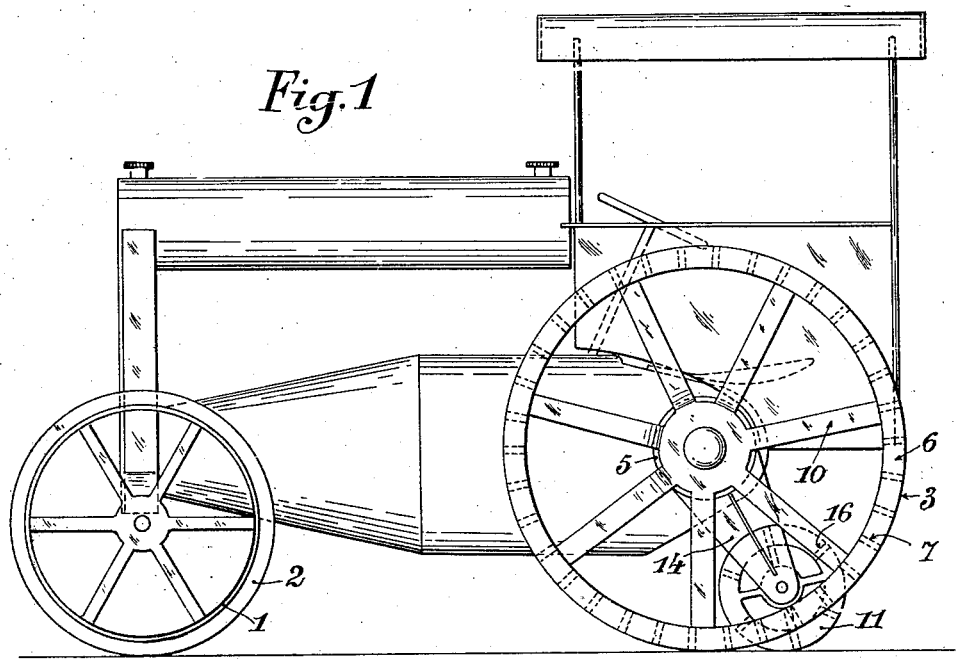

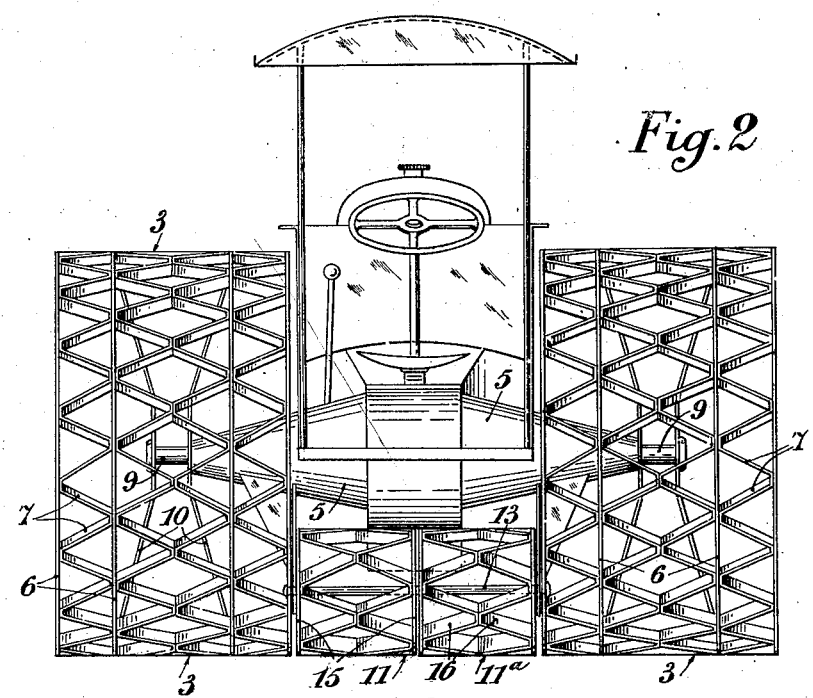
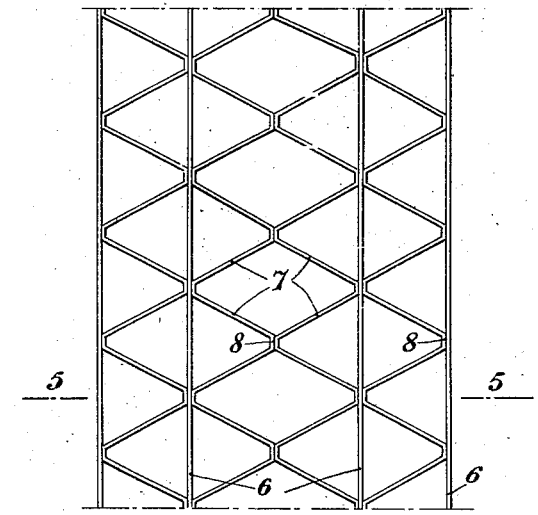
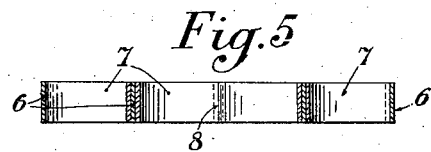

1,839,000

UNITED STATES PATENT OFFICE

PHUÔNG PHAN-QUANG, OF OMON, COCHIN-CHINA

AGRICULTURAL MACHINE

Application filed April 18, 1930, Serial No. 445,307, and in France March 28, 1930.

The invention relates to agricultural machines adapted to work on soft grounds and more particularly adapted for use in rice plantations and it has for its main object to provide a machine which will be able to prepare the ground by cutting off the weeds and roots even on a sandy and muddy ground.

It has already been proposed to provide tractors and agricultural engines with hollowed rims in order to facilitate the progress of the engine on the ground.

In carrying my invention into practice, I make use of such type of wheels, having hollowed rims adapted to cut off the weeds and roots. The machine is provided with outer and inner wheels and the latter are so arranged as to cover the whole space between the outer wheels.

Other features of my invention will appear from the following specification:

In the accompanying drawings, given solely by way of example:

Fig. 1 is a side view of an improved machine according to the invention.

Fig. 2 is a rear view thereof.

Fig. 3 is a horizontal view thereof, with some parts removed.

Fig. 4 shows a fragmentary development of the rim of an improved wheel according to this invention.

Fig. 5 is a section of this rim on line 5—5 of Fig. 4.

On Figs. 1 to 3, is shown a conventional type of tractor or agricultural machine, provided in front with carrying-wheels 1 which may be of any type. Those shown comprise a flange rim 2, of the type used with waggon or locomotive wheels, so as to enable flange 2 to reach solid ground more easily by cutting through the sand or mud.

According to this invention, the rear driving-wheels 3 of the tractor, of any dimensions and width, and keyed for instance on the driving axle 4 in the bearing-trumpets 5, have a lattice-formed rim. Said rim could, of course, consist of a metallic cylinder perforated in any suitable way, such perforations being of suitable dimensions.

Nevertheless, said rim is preferably constructed as shown. It comprises a plurality of flat rings 6, the width thereof being radially disposed. These rings are connected by rings 7, made of a zig-zag folded or corrugated flat bar. Each corrugated ring 7 may be welded or otherwise secured between two flat rings, or conversely two zig-zag or corrugated rings may be joined by welding, riveting, bolts, etc. . . . , as shown for example at 8.

Hub 9 keyed on axle 4 or driven by any other means (by cog-rim and chain or by pinion, etc.) is connected with the rim by a plurality of spokes 10 fitted to flat rings 6; these can be cast or stamped together, etc., or they may be built on one another and fastened in any manner.

In the example illustrated, the carrying and driving wheels 3 are assisted by two carrying wheels or rollers 11 and 11a which cover the whole width of the track between the wheels 3. These rollers, arranged under the tractor, are mounted loose on an axle 13, carried by two cheeks 14, cast with the trumpet like parts 5 of the rear axle casing or fastened to them in any known manner. Rollers 11 and 11a are formed in a similar manner as wheels 3, of two latticed cheeks 15, between which are welded or otherwise secured two rings 16, each made of a zig-zag folded or corrugated flat bar.

Obviously, the front wheels 1 may have the same formation.

Owing to the very large apertures provided in the rims of wheels 3 and rollers or cylinders 11 and 11a, the said rims are capable, under the weight of the vehicle, to reach solid ground very easily, sand, water or mud being forced through the rim. They reach it all the more easily that the contact surface with the ground is greatly lessened, while, on the other hand, the bearing surface is increased by rollers or cylinders 11 and 11a.

As wheels 3 reach the solid ground, they no longer skid and allow easy progression of the vehicle. As a matter of fact, said wheels easily grip the solid ground owing to the many projections constituted by the metallic blades of the rim.

The sharp-edged projections of wheels 3 and of rollers or cylinders 11 and 11a own as another advantage the faculty of breaking the weeds over which they pass and thereby destroying them. Inasmuch as there is substantially no free space left between the wheels and rollers 11, 11ᵃ, the weeds and roots will be cut off and removed over the whole width of the track of the machine.

It will be readily understood that this invention is in no way restricted to the construction illustrated and described which has only been chosen by way of example.

Having now described my invention what I claim as new and desire to secure by Letters Patent is:

1. In an agricultural engine the combination of a rear axle, outer wheels on said rear axle, inner wheels, means for supporting said inner wheels, the outer and inner wheels having hollowed rims adapted to cut off weeds, and the inner wheels being so arranged that they cover the whole space between the outer wheels.

2. In an agricultural engine, the combination of a rear axle, two driving wheels on the ends of said rear axle, a rear axle casing, carrying wheels adapted to cover the whole space between the driving wheels and means on the rear axle casing for supporting said carrying wheels, the driving and carrying wheels having hollowed rims adapted to cut off weeds.

3. In an agricultural engine, the combination of a rear axle, two driving wheels on the ends of said axle, a rear axle casing, supporting arms extending rearwardly from said rear axle casing, a horizontal shaft journalled in said supporting arms, carrying wheels freely mounted on said shaft, in such a position as to bear on the ground at a small distance from the lowest point of the driving wheels, said carrying wheels being of a smaller diameter than the driving wheels and adapted to cover the whole space between the driving wheels, the driving and carrying wheels having hollowed rims adapted to cut off weeds.

In testimony whereof I have signed my name to this specification.

PHUÔNG PHAN-QUANG.